United States Patent [19]

Hankosky

[11] 3,955,794
[45] May 11, 1976

[54] HERMETICALLY SEALED VALVE WITH FIXED DIFFUSER

[75] Inventor: Andrew Hankosky, Pittsburgh, Pa.

[73] Assignee: Rockwell International Corporation, Pittsburgh, Pa.

[22] Filed: Feb. 20, 1975

[21] Appl. No.: 551,260

[52] U.S. Cl. .............................. 251/123; 251/118
[51] Int. Cl.² .......................................... F16K 47/16
[58] Field of Search ........... 251/118, 124, 120, 121, 251/122, 123

[56] References Cited
UNITED STATES PATENTS

| | | | |
|---|---|---|---|
| 1,365,852 | 1/1921 | Richmond | 251/118 X |
| 2,111,836 | 3/1938 | Boyd | 251/120 X |
| 2,229,600 | 1/1941 | Park | 251/118 |
| 2,235,299 | 3/1941 | Park | 251/122 |
| 2,393,442 | 1/1946 | Yellott et al. | 251/121 |
| 2,897,836 | 8/1959 | Peters et al. | 251/118 X |
| 3,286,979 | 11/1966 | Brown et al. | 251/118 |

Primary Examiner—Arnold Rosenthal

[57] ABSTRACT

A hermetically sealed valve includes a valve body having an annular seat adjacent the valve inlet with a frusto-conical surface diverging outwardly therefrom toward the valve outlet and a fixed diffuser assembly including a fixed disc guide and a slidable spring biased closure disc. The disc guide has a diverging frusto-conical surface spaced from the first surface to define a high efficiency annular diffuser flow passage. The fluid exposed surfaces of the disc are located upstream of the passage. The closure disc is actuated between an open position and a closed position by an axially movable valve stem acting on a flexible diaphragm. The pressure drop in the diffuser passage at high flow conditions establishes a force differential on the diffuser assembly acting toward the valve seat which is borne entirely by the disc guide thereby eliminating any pull down forces on the closure disc.

3 Claims, 3 Drawing Figures

HERMETICALLY SEALED VALVE WITH FIXED DIFFUSER

BACKGROUND OF THE INVENTION

The present invention relates to a valve assembly having a diffuser flow passage and, in particular, a hermetically sealed valve having a high efficiency diffuser flow passage wherein the flow therethrough is controlled by a diaphragm actuated spring biased closure member lying substantially entirely upstream of the passage to thereby be isolated from valve pull down forces during high flow conditions in the passage.

A valve assembly having an improved flow passage for a diaphragm or bellows type isolation valve is disclosed in the U.S. Pat. application Ser. No. 402,165 filed in the name of E.B. Pool et al on Oct. 1, 1973 and assigned to the assignee of the present invention. Therein, axial movement of the valve closure member is limited by the permissible flexure of a metal diaphragm disc which hermetically separates the valve stem from the former and the valve control chamber. To prevent an excessive pressure drop across the valve seat such as would normally occur due to the thus limited movement, a high efficiency annular diffuser passage is provided between a frusto-conical surface on the valve closure member and opposed frusto-conical surface downstream on the valve seat. The diffuser passage prevents the high velocity fluid from expanding too rapidly and thus dissipating the fluid head.

While providing a distinct advantage over prior low lift valve designs, we have determined that under certain high flow conditions, a hydrodynamic pull down force was exerted on the valve closure member due to the low pressure conditions in the diffuser passage. Depending on the spring load biasing closure member toward disphragm and the flow velocity through the passage, the resultant force on the closure member can cause the latter to move to a partially opened equilibrium position. This can occur with a valve initially in a stable fully open position if the flow is increased to exceed a threshold level where the pulldown force exceeds the spring force, or it can occur during the valve opening cycle or the valve closing cycle.

During the valve opening cycle, the pull down force can prevent the valve from opening beyond the equilibrium position regardless of valve stem position. During the valve closing cycle, as soon as threshold conditions are reached, the valve can immediately retract to the equilibrium position. While this effect can be partically obviated by increasing the valve diameter, this cannot be totally corrected even where sufficient valve seat space is available to permit enlargement thereof.

The present invention eliminates the aforementioned valve pull down forces by incorporating a fixed diffuser assembly which substantially bears all pull down forces developed in the diffuser passage. The diffuser assembly has a frusto-conical diffuser surface which defines with an opposed surface downstream of the valve seat the optimum flow passage conditions for a given valve design. The diffuser surface is permanently fixedly positioned at a location corresponding to the fully open position of the valve closure member. The diffuser assembly has a central axial bore in which a spring biased valve closure disc is slidably supported. The closure disc has an annular seating surface which is axially movable with respect to the opposed annular valve seat under the control of an axially movable valve steam hermetically separated from the closure disc by a flexible diaphagm. In the closed position, the closure disc completely closes the flow passage. In the open position, the aforementioned surfaces establish the diffuser passage. The fluid exposed surfaces of the closure disc are located inwardly of the diffuser passage and thus are not exposed to the pressure differentials of the prior assembly. This eliminates valve pull down forces regardless of valve seat diameter, permissible valve lift, flow velocity or spring load.

The above and other features of the present invention will be apparent to those skilled in the art upon reading the accompanying detailed description, reference being made to the accompanying drawings illustrating a preferred embodiment thereof.

Figure 1:
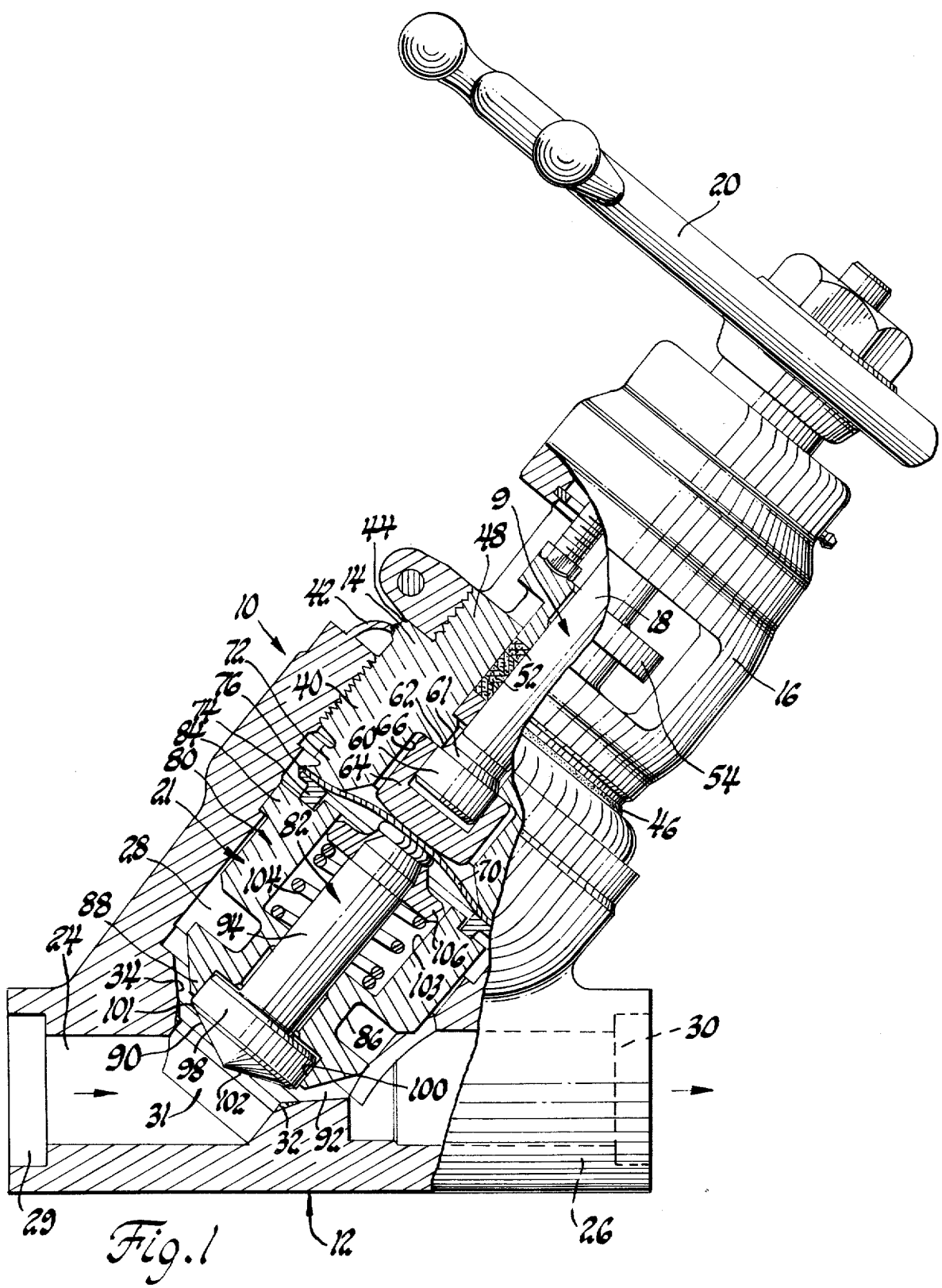
FIG. 1 is a partially sectioned elevational view of a hermetically sealed valve with a fixed diffuser showing the valve in the fully opened position.

Referring to the drawings and in particular FIG. 1, there is shown a hermetically sealed valve 10 of the type used as an isolation or shut off valve for toxic fluids or for safety systems in nuclear fueled power generating plants. Such valves are normally used in the closed position to shut off or isolate a fluid under pressure from a flow system and in an open position to delivery the pressurized fluid to the flow system.

In The open position, the pressure drop across the valve must be minimized to insure that the fluid delivered to the flow system is under sufficient pressure for the latter's requirements. Accordingly, it has been found desirable to provide a high efficiency diffuser flow passage for minimizing the pressure drop across the valve. An example of such a system is shown and described in the aforementioned U.S. Pat. application Ser. No. 402,165. The present invention will be described with reference to the improvements thereover. Reference may be had to that application for additional description relative to the valve structure.

Herein, the hermetically sealed valve 10 comprises a valve body 12, a bonnet 14, a yoke assembly 16, a stem assembly 18, a hand wheel 20 and a diffuser assembly 21. The valve 10 has and inclined stem construction and internally includes an inlet 24 axially aligned with an outlet 26 and angularly intersected by a cylindrical control chamber 28. The valve body 12 is adapted to be connected to a high pressure fluid line for delivering high pressure fluid in the direction of the arrows. The inlet 24 and the outlet 26 are provided with counterbores 29 and 30, respectively, for telescopically receiving the ends of flow conduits for integral attachment thereto by welding.

A passage 31 surrounded by hardened annular valve seat 32 is formed at the downstream end of the inlet 24. The valve seat 32 is separated from the control chamber 28 by frusto-conical diffuser surface 34 coaxial with the passage 31, the valve seat 32 and control chamber 28. The upper end of the control chamber 28 is tapped and receives a threaded shank 40 of the bonnet 14.

The upper end of the valve body 12 is provided with an inwardly curved canopy 42 which is hermetically connected to a peripheral rim 44 of the bonnet 14 by a weld 46. A threaded shank 48 at the upper end of the bonnet 14 is threaded to the lower end of the yoke assembly 16. The stem assembly 18 extends axially through the bonnet 14 and the yoke assembly 16. The stem assembly 9 is axially movable in a conventional manner by means of the hand wheel 20. A packing 52 contained in a bore at the upper end of the bonnet 14 is compressed against the outer surface of the stem assembly 18 by means of a packing gland assembly 54. The stem assembly 18 includes an enlarged cylindrical lower end 60 having a conical surface 61, engageable with a backseat 62 to limit opening movement thereof. The cylindrical end 60 is loosely received in an open upper end of a diaphragm cylindrical actuator disc 64. The actuator disc 64 is retained within a counter bore 66 formed in the lower end of the bonnet 14. A flexible diaphragm 70 is retained between a lower rim 72 of the bonnet 14 and an annular retainer ring 74 by means of a peripheral weld 76. The weld 76 hermetically seals the diaphragm 70 across the open end of the counterbore 66 and established a hermetic seal between control chamber 28 and the axial stem passage. The welds 46 and 76 thus establish dual hermetical barriers to fluid leakage to the environment.

Referring to FIG. 1, the diffuser assembly 21 includes annular diffuser disc guide 80 carrying an axially movable closure disc 82. The disc guide 80 includes an upper annular flange 84 slidably received within a complementary counterbore formed at the upper end of the control chamber 28. The guide 80 further includes a reduced diameter neck portion 86 downwardly terminating with a generally frusto-conical enlarged head 88 having a frusto-conical lower surface 90. The lower surface 90 is axially spaced from the frusto-conical diffuser surface 34. The surfaces 90 and 34 define therebetween a high efficiency annular diffuser passage 92, the details of which are selected to optimize a given valve size and application. The frusto-conical diffuser surface 34 and lower surface 90 diverge radially outwardly to define a progressively increasing annular flow passage toward the chamber 28 downstream from the valve seat 32. The closure disc 82 includes a cylindrical stem 94 that engages the lower surface of the flexible diaphragm 70 having an enlarged head 98 at the lower end thereof. The head 98 is slidably received in a counterbore 100 formed in the lower surface of the diffuser guide 80. The head 98 has a convex fluid exposed front surface 102 which is located substantially entirely upstream of the passage 92.

Figure 3:
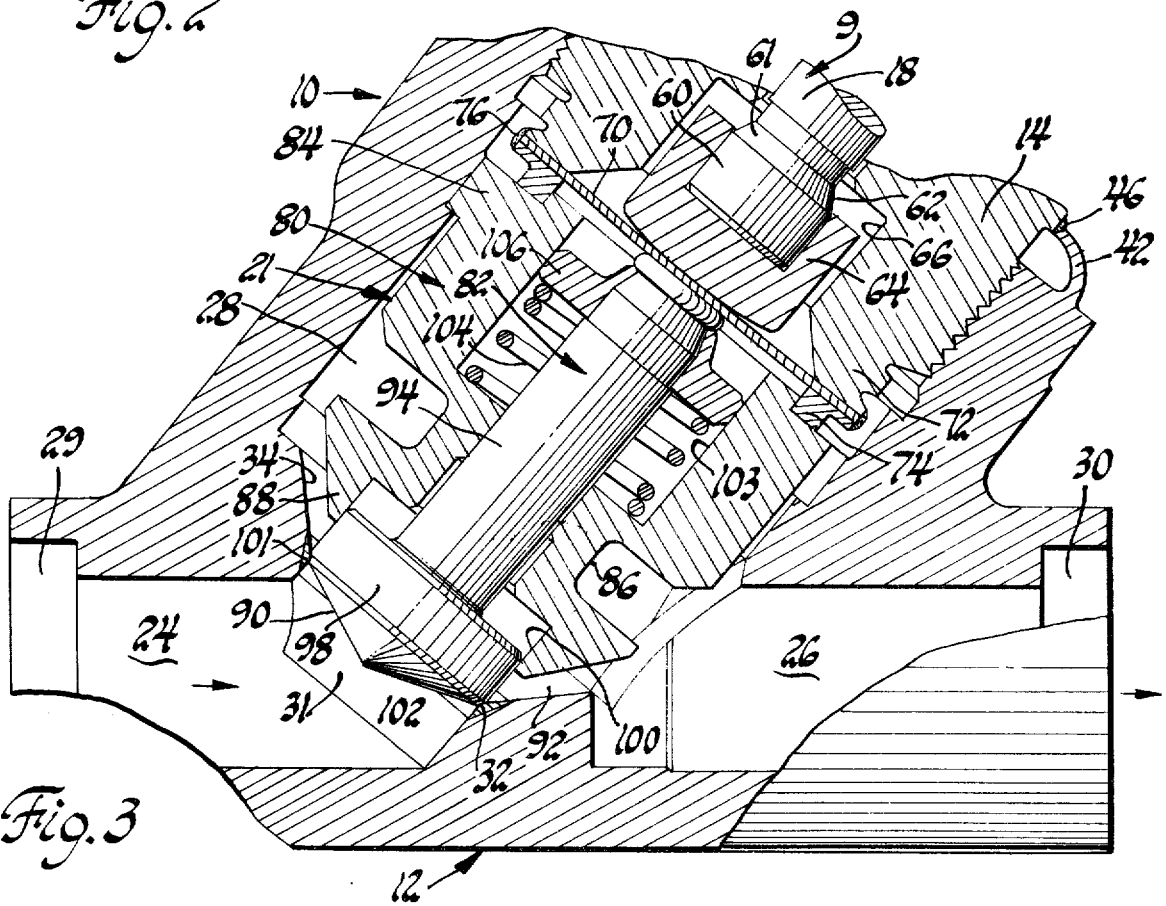
FIG. 3 is a view similar to FIG. 2 showing the valve in the closed position.

The guide 80 includes an upwardly open bore 103. A helically coiled compression spring 104 is compressibly retained in the bore 103 between the the lower surface thereof and stem cap 106 carried at the upper end of the stem 94. The compression spring 104 serves to upwardly bias the head 98. Upon rotation of handwheel 20, the main stem assembly 18 is translated axially downwardly causing the actuator disc 64 to downwardly flex the diaphragm 70 and in turn downwardly shift the stem 94 and the head 98 to the closed position shown in FIG. 3 wherein a chamfered seating surface 101 on the latter sealingly engages the valve seat 32.

Figure 2:
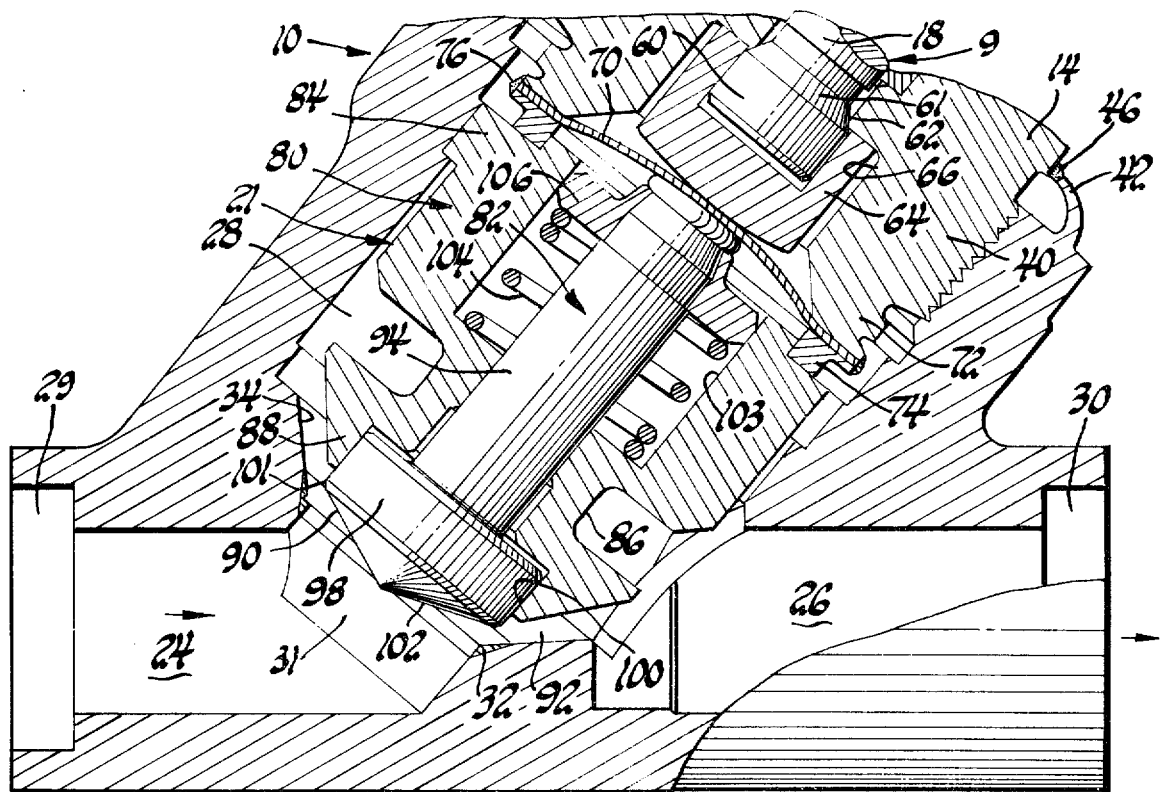
FIG. 2 is an enlarged sectional view showing the valve in the open position.

In the open position shown in FIG. 2, the annular diffuser passage 92 provides for a minimum pressure drop as the fluid passes between the inlet and the control chamber 28. However, as the fluid flow velocity increases, the presure differential between the annular diffuser passage 92 and the control chamber 28 increases. Accordingly, in diffuser constructions of the type described in Ser. No. 402,165 wherein the entire diffuser section is exposed to fluid and axially shiftable against the biasing of a spring, under high fluid flow conditions, a valve pull down force is developed. This pull down force will downwardly shift the diffuser against the biasing of the spring until an equilibrium position is reached. The reduced flow area thus established results in increasing pressure drops between the inlet and the outlet. However, in the present invention wherein the opposed surfaces of the diffuser passage are fixedly spaced, the entire resultant downward force therein is borne by a rigid member. In other words, inasmuch as the fluid exposed surfaces of the head 98 are located entirely radially inwardly of the diffuser passage 92 no resultant valve closing or pull down force is developed. Accordingly, regardless of flow conditions in the passage, the valve will remain in the fully retracted open position. In this connection, tests have shown that no measurable valve closing force can be observed with such a consturction regardless of fluid flow velocity, the minimal system requirement being that the compression spring 104 develop sufficient force to overcome only the weight of the closure disc. Thus, the full passage between the closure disc and the valve seat is affirmatively established by the position of the stem 94 and is immune from any effects of diffuser passage conditions.

Although only one form of this invention has been shown and described, other forms will be readily apparent to those skilled in the art. Therefore, it is not intended to limit the scope of this invention by the embodiment selected for purpose of this disclosure, but only by the claims which follow:

I claim:

1. A hermetically sealed valve, comprising: a valve body having an inlet port for receiving high pressure fluid, an outlet port for delivering the fluid, a cylindrical control chamber communicating with the outlet port and having an axis intersection the axis of the inlet port, and a through passage coaxial with said control chamber fluidly interconnecting the inlet port with the control chamber; a frusto-conical diffuser surface coaxial with the control chamber and flaring outwardly from the passage thereto; a hardened valve seat at the intersection of said passage and said diffuser surface; a diffuser assembly fixedly mounted in said control chamber and having a head portion with an outwardly flaring frusto-conical surface in spaced relationship to said frusto-conical diffuser surface and defining therebetween an outwardly expanding low pressure drop annular diffuser passage, said head portion having a first counterbore in the lower surface thereof coaxial with the through passage in the control chamber and having a diameter slightly larger than said passage; a central opening in said diffuser assembly including an enlarged second counterbore at the upper portion thereof; and axially movable closure disc slidably supported on said diffuser assembly, said closure disc having a head section slidably received in the first counterbore and a stem projecting axially upwardly through said central opening in said diffuser assembly and including a terminal portion in said second counterbore, said closure disc having an annular peripheral seating portion slightly larger than said passage and adapted to sealingly engage said valve seat in a closed position, and further having a convex tip portion penetrating the passage in the closed position; spring means received in said second counterbore and operative to bias the closure disc to a retracted position opening the diffuser passage; a flexible diaphragm at the end of the chamber and hermetically sealing the latter; a valve stem engaging the upper portion of said diaphragm and operative against the diaphragm to shift the closure disc between an extended cloaed position and a retracted open position against the biasing of said spring means to thereby open and close said diffuser passage, the closure disc being exposed to essentially no hydrodynamic pressure differentials at the head section thereof which would produce forces thereon in a direction acting to close said closure disc.

2. A valve, comprising: a valve body, an inlet port in the valve for receiving high pressure fluid; an outlet port in the valve body for discharging the fluid; a cylindrical control chamber in the valve communicating with the outlet port and having an axis intersecting the axis of the inlet port passage means formed in the valve body fluidly interconnecting the inlet port with the control chamber; a frusto-conical diffuser surface in the valve body at the lower end of the control chamber flaring inwardly and terminating with an annular valve seat at the intersection of said passage means and said diffuser surface; a diffuser assembly fixedly mounted in said control chamber; a frusto-conical head on the diffuser assembly and axially spaced from the said diffuser surface to define therebetween an outwardly expanding annular diffuser passage lying substantially radially outwardly of the passage means, said head portion having a counterbore in the lower surface thereof coaxial with and slightly larger in diameter than the passage means in the control chamber; and opening axially extending through said diffuser assembly including an enlarged counterbore at the lower portion of the head portion; a closure disc having a head section adapted to be slidably received in the counterbore in a retracted open position and a stem slidably received in the opening in said diffuser assembly, said closure disc having a peripheral portion slightly larger than said passage means and adapted to sealingly engage said valve seat in an extended closed position and being substantially inward of the diffuser passage to be isolated from flow conditions therein in said retracted open position; spring means between the diffuser assembly and the stem operative to bias the closure disc to said retracted open position; valve stem means engaging said stem and for shifting the closure disc between the retracted open position and the extended closed position, the closure disc thus being located substantially entirely inwardly of the diffuser passage and so as to be isolated from pressure conditions in the diffuser passage.

3. In a valve having a valve body including a fluid inlet, a fluid outlet, a chamber between the inlet and the outlet, an annular valve seat at the exit of the inlet, an annular flared surface downstream of the seat between the inlet and the chamber, and a valving means movable with respect to the valve seat to an open position assisted by biasing means and a closed position opposed by the biasing means and which in the open position has an annular flared surface thereon spaced from the first mentioned flared surface and defining therebetween an annular diffuser passage of increasing cross-sectional area outwardly of and downstream of the valve seat, said diffuser passage having a low pressure drop thereacross that causes a hydrodynamic pulldown force in the passage on the valving means, said force acting toward the seat at said passage and tending to override the biasing means and partially close the passage resulting in increased pressure drops between the inlet and outlet, the improvement comprising:

fixedly positioning a first portion of the valving means with respect to the valve seat with said first mentioned flared surface thereof extending outwardly of the valve seat whereby said pulldown force is substantially borne thereby, slidably supporting a second portion of the valving means on the first portion substantially entirely upstream of the diffuser passage so as to be substantially isolated from said pulldown force, said second portion being axially movable with respect to the first portion between the open position and the closed position wherein an annular surface thereon sealingly engages the valve seat to close the passage whereby said second portion is not exposed to diffuser passage flow conditions tending to overide the biasing means.

* * * * *